United States Patent
Porikli

(10) Patent No.: US 6,904,159 B2
(45) Date of Patent: Jun. 7, 2005

(54) IDENTIFYING MOVING OBJECTS IN A VIDEO USING VOLUME GROWING AND CHANGE DETECTION MASKS

(75) Inventor: Fatih M. Porikli, North Plainfield, NJ (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 701 days.

(21) Appl. No.: 10/026,984

(22) Filed: Dec. 20, 2001

(65) Prior Publication Data

US 2003/0118214 A1 Jun. 26, 2003

(51) Int. Cl.$^7$ .............................................. G06K 9/00
(52) U.S. Cl. .................................................... 382/103
(58) Field of Search ................................ 382/103, 107, 382/154, 236, 283; 352/39; 348/14.1, 154, 155, 169, 208.13, 208.14, 431.1; 725/12

(56) References Cited

U.S. PATENT DOCUMENTS

| | | | | |
|---|---|---|---|---|
| 5,612,744 A | * | 3/1997 | Lee et al. ................. | 348/416.1 |
| 6,075,875 A | * | 6/2000 | Gu ............................. | 382/107 |
| 6,349,113 B1 | * | 2/2002 | Mech et al. ............ | 375/240.08 |
| 6,501,794 B1 | * | 12/2002 | Wang et al. ........... | 375/240.08 |
| 6,785,329 B1 | * | 8/2004 | Pan et al. ............... | 375/240.08 |
| 2003/0081836 A1 | * | 5/2003 | Averbuch et al. ........... | 382/199 |

* cited by examiner

Primary Examiner—Andrew W. Johns
Assistant Examiner—Shervin Nakhjavan
(74) Attorney, Agent, or Firm—Dirk Brinkman; Andrew J. Curtin

(57) ABSTRACT

The method combines volume growing with change detection. After an input video is filtered to remove noise, a spatio-temporal data structure is formed from the video frames, and markers are selected. From the markers, volumes are grown using a color similarity based centroid linkage method. Change detection masks are then extracted from adjacent frames in the video using local color features. The change detection masks are intersected with each volume, to determine the number of changed pixels only in portions of the masks that lie within that volume. If the number of changed pixels in the intersection exceeds a threshold, then the volume is identified as a moving object.

8 Claims, 4 Drawing Sheets

IDENTIFYING MOVING OBJECTS IN A VIDEO USING VOLUME GROWING AND CHANGE DETECTION MASKS

FIELD OF THE INVENTION

The invention relates generally to video processing, and in particular, to identifying moving objects in a video.

BACKGROUND OF THE INVENTION

Many videos require processing to find objects, determine events, quantify application-dependant visual assessments, as shown by the recent MPEG-4 and MPEG-7 standardization efforts, and to analyze characteristics of video sequence, see, e.g., R. Castagno, T. Ebrahimi, and M. Kunt, *"Video segmentation based on multiple features for interactive multimedia applications,"* IEEE Trans. on Circuits and Systems for Video Technology, Vol. 8, No. 5, pp. 562–571, September 1998. Content-based video representation requires the decomposition of an image or video sequence into specific objects, i.e., separating moving persons from static backgrounds.

Many television broadcasts contain scenes where a person is speaking in front of a relatively static background, i.e., news programs, panel shows, biographies, soap operas, etc. Also, video-conference applications extensively use head-and-shoulder scenes to achieve visual communication. Increasing availability of mobile video cameras will prevail peer-to-peer, bandwidth constrained facial communication in the future. Thus, accurate object segmentation of head-and-shoulder type video sequences, also known as "talking head," is an important aspect of video processing.

However, automatic segmentation of head-and-shoulder type sequences is difficult. Parameter based methods cannot accurately estimate the motion of an object in that type of sequence, because usually, a talking head sitting at a disk exhibits minimal motion. Moreover, motion-based segmentation methods are computationally expensive and unreliable. Region-based methods have disadvantages such as over-segmentation and can fail to determine a region-of-interest. Frame difference based methods suffer from inaccurate object shape determinations.

Another method for object segmentation utilizes volume growing to obtain the smallest color consistent components of a video, se, e.g., F. Porikli, and Y. Wang, *"An unsupervised multi-resolution object extraction algorithm using video-cube,"* Proceedings of Int. Conf. Image Process, Thesselaniki, 2001, see also, U.S. patent application Ser. No. 09/826,333 *"Method for Segmenting Multi-Resolution Video Objects,"* filed by Porikli et al. on Apr. 4, 2001. First, a fast median filter is applied to video to remove local color irregularities, see, e.g., M. Kopp and W. Purgathofer, *"Efficient 3×3 median filter computations,"* Technical University, Vienna, 1994. Then, a spatio-temporal data structure is formed from the input video sequence by indexing the image frames and their features. The object information can be propagated forward and as well as backward in time by treating consecutive video frames as the planes of a 3D data structure. After a video sequence is filtered, marker points are selected by color gradient. A volume around each marker is grown using color distance. The problem with video volumes is that moving objects are indistinguishable from static objects. For example, with volume growing a blank wall of a distinct color will form a volume.

A change detection mask (CDM) is a map of pixels that change between previous and the current frames of a pair of frames in a sequence of video. A CDM is defined as the color dissimilarity of two frames with respect to a given set of rules. Considering a stationary camera, consistent objects, and constant lighting conditions, the pixel-wise color difference of a pair of adjacent frames is an indication of moving objects in the scene. However, not all the color change happens because of moving objects. Camera motion, intensity changes and shadows due to the non-uniform lighting across video frames, and image noise also contribute to frame difference. The computational simplicity makes the CDM practical for real-time applications, see, e.g., C. S. Regazzoni, G. Fabri, and G. Vernazza, *"Advanced video-based surveillance system"*, Kluwer Academic Pub., 1999. However, using the CDM alone to determine moving objects renders poor segmentation performance.

Therefore, there is a need for an improved, fully automatic method for precisely identifying any number of moving objects in a video, particularly where the object has very little motion relative to the background, e.g., a talking head. The method should integrate both motion and color features in the video over time. The segmentation should happen in a reasonable amount of time, and not be dependent on an initial user segmentation, nor homogeneous motion constraints.

SUMMARY OF THE INVENTION

The present invention provides an automatic method for identifying moving objects in a video. The method combines volume growing with change detection. After an input video is filtered to remove noise, a spatio-temporal data structure is formed from the video frames, and markers are selected. From the markers, volumes are grown using a color similarity based centroid linkage method. Change detection masks are then extracted from adjacent frames in the video using local color features. The change detection masks are intersected with each volume, to determine the number of changed pixels only in portions of the masks that lie within that volume. If the number of changed pixels in the intersection exceeds a threshold, then the volume is identified as a moving object.

DETAILED DESCRIPTION OF THE PREFERRED EMBODIMENT

Figure 1:
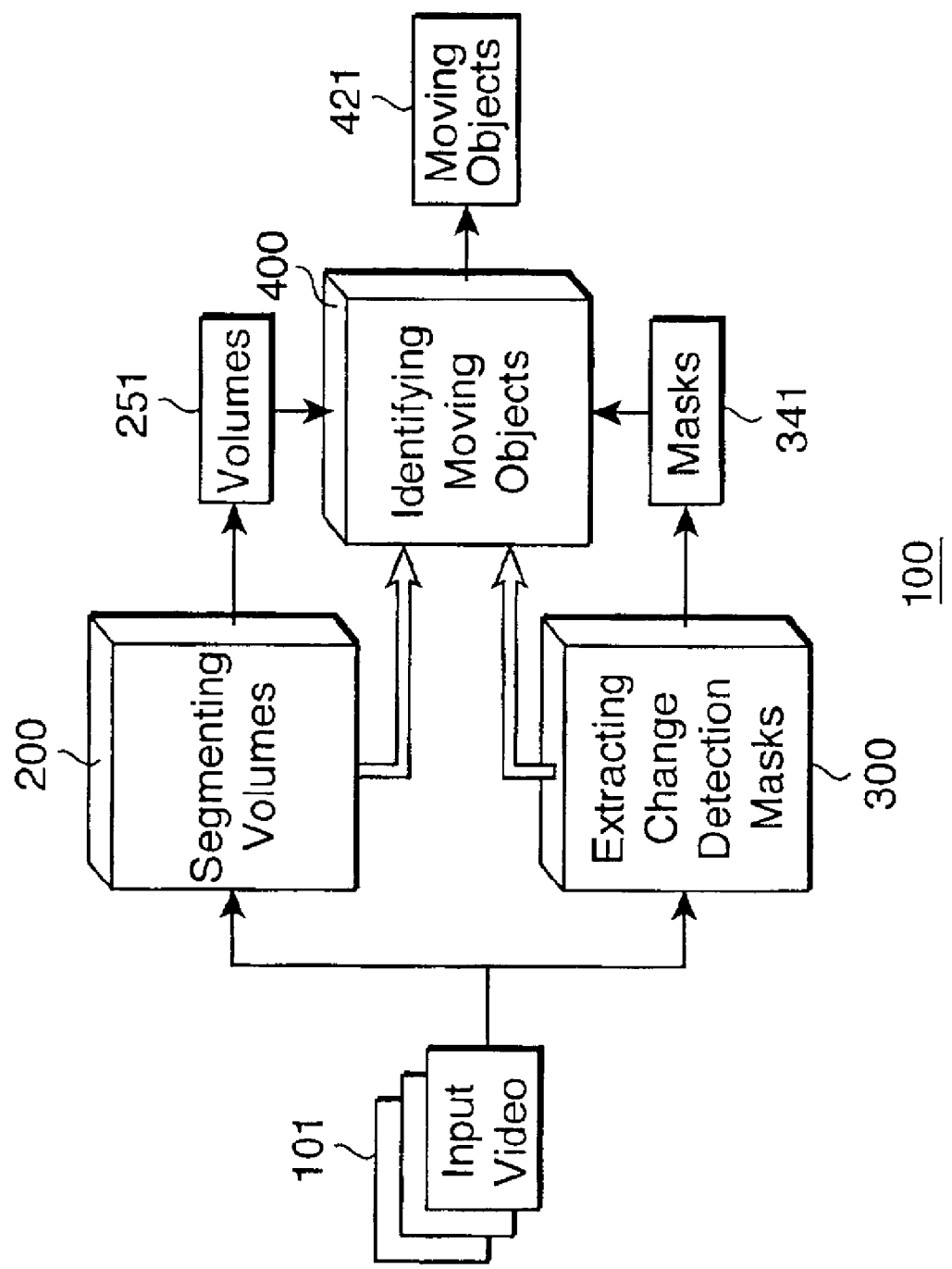
FIG. 1 is a block diagram of a method for identifying moving objects in a video according to the invention.

The invention identifies moving objects in a video 101 using spatiotemporal volume growing and change detection masks. The invention is particularly useful to identify objects in a video that have little motion, such as "talking heads." As shown in FIG. 1, a first step segments 200 volumes 241 from the video 101 by constructing a spatiotemporal data structure from frames of the video 101. Markers $m_i$ are selected from the data structure. The markers are starting points for growing the volumes $V_i$ 241. A second step extracts 300 change detection masks 341 from the input video 101. The masks are extracted by determining a change in color features of corresponding pixels in an adjacent pair of frames. In a third step, the extracted masks 341 are applied to the volumes 241 to identify 400 moving objects 421 in the video 101.

Segmenting Volumes

Constructing Spatiotemporal Data Structure S

Figure 2:
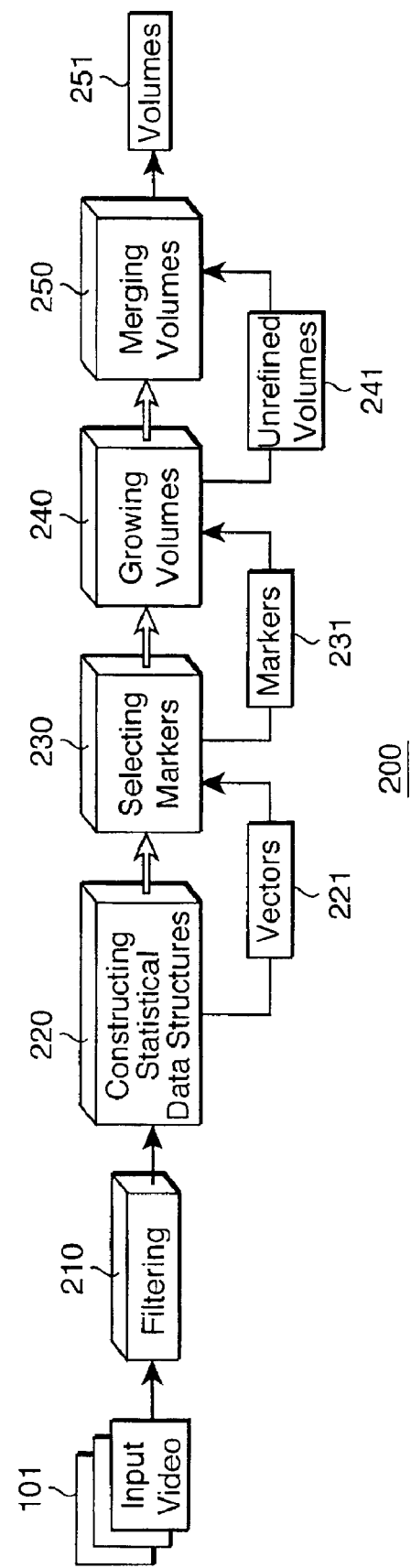
FIG. 2 is a block diagram of a segmenting volumes step of the method of FIG. 1.

FIG. 2 shows the details of the segmenting step 200 of FIG. 1. First, in an optional preprocessing step, fast median filtering 210 is applied to the video 101 to remove local irregularities. The next step constructs 220 the spatiotemporal data structure S 221 from the pixels of the frames of the input video 101. Each element in the data structure S(x,y,t) is a vector w(x,y,t) that includes color values and change detection scores of a pixel at a location (x,y,t), where (x,y) are coordinates of the pixel in a particular frame t of the input video 101.

Marker Selecting

A vector with a minimum color gradient magnitude is selected 230 as a marker 231. The marker 231 is the starting point for growing 240 an unrefined volume 241. In one preferred embodiment, a YUV color space is used because this color space performs in accordance with human visual perception, and inter-color distances can be computed by the magnitude or Euclidian distance norms. Any color space can be used as far as inter-color distance formula is adapted accordingly.

The marker is selected 230 by determining which of the vectors 221 has a minimum color gradient magnitude because vectors with minimum gradient magnitudes best characterize a uniformly textured local neighborhood of pixels. The color gradient magnitude $|\nabla S|$ is determined by:

$$|\nabla S(x, y, t)| = |w_y(x^-, y, t) - w_y(x^+, y, t)| + \qquad (1)$$
$$|w_u(x, y^-, t) - w_u(y^+, t)| + |w_v(x, y, t^-) - w_v(x, y, t^+)|,$$

where ( )$^-$ and ( )$^+$ represent equal distances from a central pixel in the local neighborhood. For computational simplicity, only the luminance component $w_y$ is used. Then, the vector with the minimum gradient magnitude is selected 230 as a marker $m_i$ 231.

Growing Volumes

An unrefined volume 241 is grown 240 around the marker 231. A centroid-linkage method is used for growing volumes 240. The centroid $c_i$ is the vector w($m_i$) of the marker. An active shell includes all outer boundary vectors p$^+$ of the current volume 241. Adjacent vectors p− are selected in a 6-neighborhood that includes the vectors (x+1,y,t), (x−1,y,t), (x,y+1,t), (x,y−1,t), (x,y,t+1), (x,y,t−1), to an active shell vector (x,y,t). Vectors p− adjacent to the active shell are compared to the centroid, and a color distance d(ci,p−) between the centroid and each adjacent vectors p− is determined. If the color distance between the centroid and the adjacent vector is less than a threshold ϵ, then the adjacent vector is included in the unrefined volume, and the centroid $c_i$ is updated. To determine the color distance threshold ϵ, the pixels of the input video 101 are quantized, using dominant colors, by vector clustering in color space. The quantization improves the robustness of centroid-linkage method by simplifying the color spectrum.

When the volume 241 is grown, its vectors are removed from a set Q according to $$m_i = \arg \min_Q \left| \nabla S(x, y, t) \right|; Q = S - \bigcup_{j=1}^{i} V_j, \qquad (2)$$

where Q, initially, is the set of all vectors 221.

Then, the next vector having a minimum gradient magnitude in the remaining set is selected as a next marker, and the volume growing process is repeated 235 until no more vectors 221 remain.

Volume Merging

Merging 250 reduces irregularities in the unrefined volumes 241. Volumes that are less than a minimum size are merged 250 with adjacent volumes. For example, volumes less than 0.001 of the volume V, i.e., the entire video, are merged. To accelerate this process, the merging 250 is performed in a hierarchical manner by starting with the smallest volume, and ending with the largest volume that does not satisfy the minimum size requirement. The smallest volume that does not satisfy the minimum size requirement is merged with a closest volume. This is repeated for all small volumes in an order of increasing size.

Extracting Change Detection Masks

Determining Distances

Figure 3:
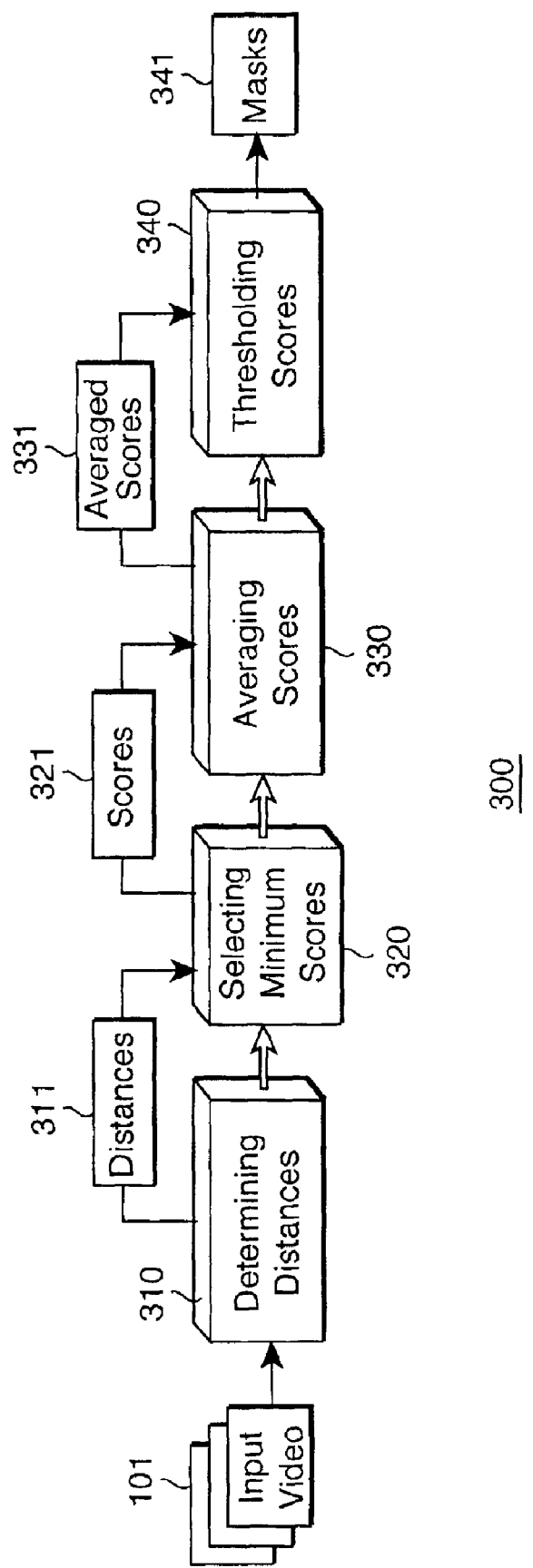
FIG. 3 is a block diagram of an extracting change detection masks step of the method of FIG. 1.

FIG. 3 shows the details of the extracting step 300 of FIG. 1. This step extracts change detection masks from adjacent pairs of frames. First, distances 311 are determined 310 for a pixel p(x,y,t) in a local window of a current frame t and a pixel $q_n(x_n,y_n,t-1)$ in an adjacent frame t−1

$$\delta(p, q_n) = \sum_{i,j} \sum_k |w_k(x, y, t) - w_k(x_{ni}, y_{nj}, t-1)|, \qquad (3)$$

where $X_{ni}, y_{nj}$ are coordinates of a pixel around the center pixel $q_n(x_n,y_n,t)$ in the window $N_1$ and k is the color components y,u,v, produces distances δ (p,q) 311. The points $q_n(x_n,y_n,t-1)$ are chosen in another window $N_2$. The color components can be chosen from any color space i.e., RGB, HIS, etc. In case a single channel input is used, k represents that single channel, i.e. gray level.

Selecting Minimum Scores

Selecting minimum scores 320 prevents minor errors in motion estimation. The minimum of distances δ(p,$q_n$) 311 in another window $N_2$ is assigned as the score Δ(p) 321 of each pixel p according to $$\Delta p = \min_n \delta(p, q), q_n \in N_2. \qquad (4)$$

Averaging Scores

Averaging scores 330 in window $N_3$ produces averaged scores 331 for thresholding 340 to produce change detection masks 341.

Thresholding Scores

Thresholding scores 340 produces binary change detection masks cdm(p) 341, $$cdm(p) = \begin{cases} 1 & \mu < \frac{1}{N_3} \sum_m \Delta(p_m) \\ 0 & \text{else} \end{cases}, \qquad (5)$$

where $\mu$ is a threshold. It can be assigned as the weighted average of the dynamic ranges of the color components. The score threshold is chosen such that the average scores 331 correspond to a cluster of changed points instead of single points. Small regions are filtered in this way.

Alternative Change Detection Masks

Other change detection masks can be used instead of the above method. These masks includes but not limited to the frame difference operators, global motion compensated masks, non-binary change detection masks. Therefore the method explained in the disclosure covers all change detection mask extraction methods. A simple change detection mask may be $$cdm(p) = \sum_{k} |w_k(x, y, t) - w_k(x, y, t-1)| \quad (6)$$

where pixel p is the pixel (x,y) in the frame t, and k represents the color components.

Applying Change Detection Masks to the Segmented Volumes

Figure 4:
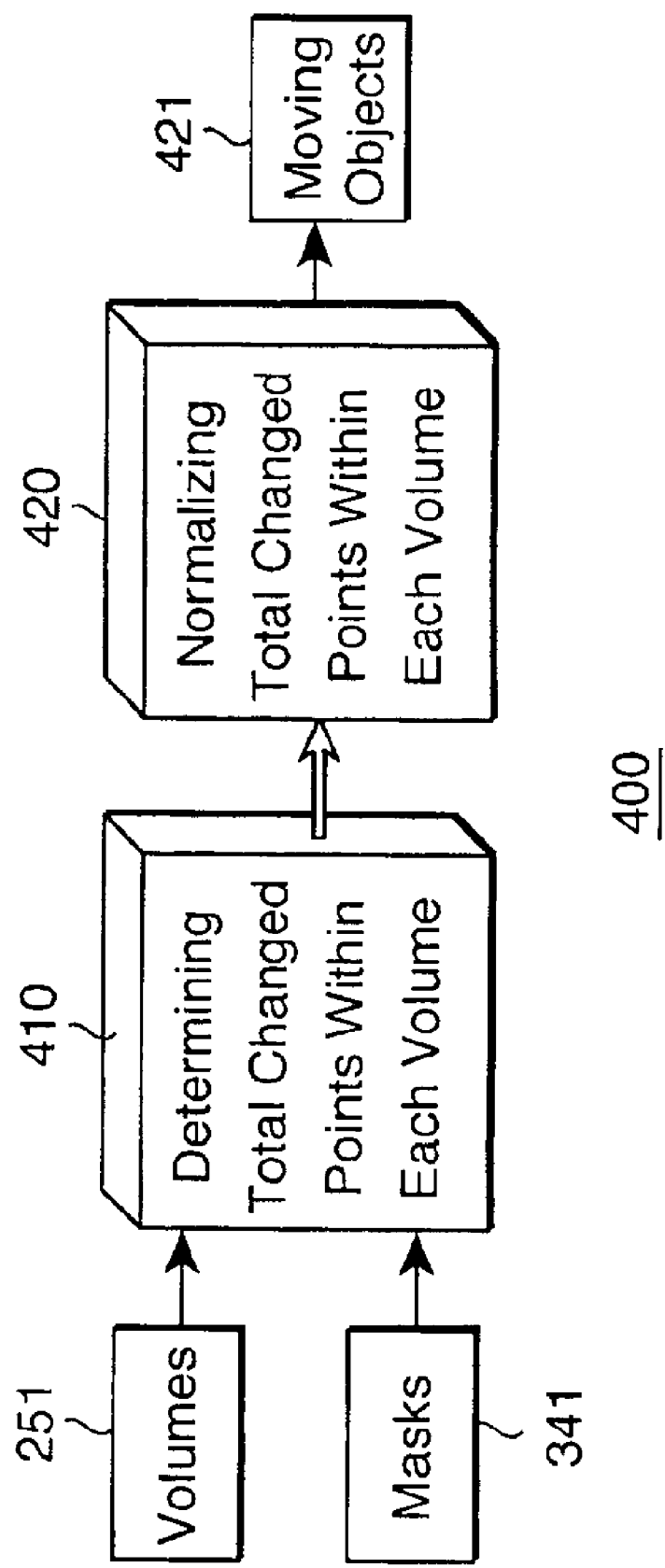
FIG. 4 is a block diagram of an identifying moving objects step of the method of FIG. 1.

FIG. 4 shows the details of the identifying step 400 of FIG. 1. After segmenting 200 volumes and extracting 300 masks, moving objects are identified 400. For each volume, count the number of changed pixels only in portions of the masks that intersects the volume. The total counts can be normalized, and volumes having counts exceeding a predetermined threshold are identified as moving objects 421.

The present invention can accurately identify a moving object in a video, particularly where the object has very little motion associated with it, e.g., a head-and-shoulders type video sequence. The method uses both motion and color features over time. The identification occurs in a reasonable amount of time, and is not be dependent on an initial user segmentation, nor homogeneous motion constraints. Identified motion objects can now readily be segmented.

A further advantage of the invention is that it does not require background registration. In addition, the invention can extract object boundaries accurately without using snake-based models or boundary correction methods. The presented method can also segment moving smoothly textured objects.

Although the invention has been described by way of examples of preferred embodiments, it is to be understood that various other adaptations and modifications may be made within the spirit and scope of the invention. Therefore, it is the object of the appended claims to cover all such variations and modifications as come within the true spirit and scope of the invention.

I claim:

1. A method for identifying moving objects in a video comprising:

segmenting the video into a plurality of volumes;

extracting a plurality of masks from the video; and applying the plurality of masks to the plurality of volumes to identify volumes corresponding to moving objects.

2. The method of claim 1 wherein the video includes a plurality of frames and each frame includes a plurality of pixels, further comprising:

constructing a spatiotemporal data structure from the pixels of the frames, wherein each element in the data structure is a vector that includes color values of a pixel (x,y,t), where (x,y) are coordinates of the pixel in a particular frame t in the video;

selecting a vector with a minimum color gradient magnitude as a marker;

growing an unrefined around each marker;

removing the unrefined volume from the data structure; and repeated the selecting, growing, and removing steps until the data structure is empty.

3. The method of claim 2 further comprising:

merging unrefined volumes that do not satisfy a minimum size requirement with a closest larger volume.

4. The method of claim 2 wherein the color gradient magnitude $|\nabla S|$ is determined by:

$$|\nabla S(x, y, t)| = |w_y(x^-, y, t) - w_y(x^+, y, t)| + \\ |w_u(x, y^-, t) - w_u(y^+, t)| + |w_v(x, y, t^-) - w_v(x, y, t^+)|,$$

where ( )⁻ and ( )⁺ represent equal distances from a central pixel in a local neighborhood of pixels.

5. The method of claim 1, further comprising:

determining distances between a pixel in a window of a current frame and pixels in a window in an adjacent frame;

selecting a minimum distance of the distances as a score of each pixel in the window in adjacent frame;

averaging the scores; and thresholding the scores to produce the masks.

6. The method of claim 1, further comprising:

using frame differences as change detection masks.

7. The method of claim 1, wherein the step of applying the plurality of masks to the plurality of volumes to identify moving objects further comprises:

counting the number of changed pixels in portions of the masks that intersect each volume; and selecting volumes having counts exceeding a predetermined threshold as moving objects.

8. The method of claim 7, further comprising:

normalizing the total counts.

* * * * *